July 2, 1963  A. J. LABUSSIERE  3,096,043
AERODYNES HAVING A SLIPSTREAM-ASSISTED WING SYSTEM
Filed April 24, 1961  10 Sheets-Sheet 1

July 2, 1963

A. J. LABUSSIERE 3,096,043

AERODYNES HAVING A SLIPSTREAM-ASSISTED WING SYSTEM

Filed April 24, 1961

July 2, 1963 A. J. LABUSSIERE 3,096,043
AERODYNES HAVING A SLIPSTREAM-ASSISTED WING SYSTEM
Filed April 24, 1961 10 Sheets-Sheet 4

United States Patent Office 3,096,043
Patented July 2, 1963

3,096,043
AERODYNES HAVING A SLIPSTREAM-ASSISTED WING SYSTEM
André J. Labussiere, Sceaux, France, assignor to Societe Anonyme des Ateliers d'Aviation Louis Breguet, Paris, France, a company of France
Filed Apr. 24, 1961, Ser. No. 104,912
Claims priority, application France May 10, 1960
12 Claims. (Cl. 244—12)

The present invention relates to aerodynes, more particularly to aeroplanes, having a slipstream-assisted wing system i.e. machines in which an even number of propellers, generally four propellers, are connected mechanically to one another and have their slipstream directed against a wing system provided with powerful high-lift devices. The blast of the propellers, deflected sharply downwards, creates a lifting force which is added to the normal force caused by the speed of advance of the machine.

An aerodyne of this kind is described in the U.S. Patent No. 2,954,943 of October 4, 1960 belonging to the applicant company.

Such machines can manoeuvre at relatively slow aerodynamic speeds, more particularly when taking-off and when landing, but they require the use of considerable power in order to create the necessary blast for providing the lifting force.

This use of power makes itself felt by an appreciable tractive force which is advantageous when the machine is taking-off, since as a result the machine rises easily. When the machine is landing, on the other hand, the behaviour of the machine is more delicate and means must be found for reducing the effect of this tractive force and therefore for increasing the drag of the machine.

Conventional means generally used for increasing drag, such as aerodynamic brakes and parachutes, are not effective at the low speeds which are used.

The present invention has as its object to provide an improvement in aerodynes of the kind specified hereinbefore, with the aim of making it possible to maintain the lifting force caused by the slipstream of the propellers whilst increasing the drag in an effective manner.

This improvement consists in equipping the machine with means whereby the pitch of the outer propellers can be reduced considerably and symmetrically when it is desired to increase the drag.

This reduction in pitch can be taken as far as what is called "transparency" i.e. the annulling of the thrust of the propeller and even as far as "reversion," i.e. the production of a thrust in the opposite direction to that of the speed of advance of the aerodyne.

Owing to the mechanical connection between the outer propellers and the inner or central propellers, under the effect of the aforesaid reduction in pitch, all the propellers tend to accelerate, the blast and the power being transferred to the central propellers. The machine is preferably also provided with a general pitch regulator which normally ensures that the propellers are adjusted to the same pitch, and advantageously the above-mentioned means can be associated with this regulator which, at the aforesaid reduction in pitch of the outer propellers, comes into action so as to increase the general pitch and stabilise the rotational speed of the propellers.

In addition to creating a powerful drag during flight, the differentiation of the pitches permits more flexible and rapid employment than with the arrangement used in conventional machines; climbing after failure to land is effected by re-equalising the pitches which instantaneously cause the supplementary drag to disappear without causing the delay due to the acceleration of the engine and of the propellers. Conversely, breaking by "reversion" is facilitated: The engines being already at a high speed upon contact, there is no power response interval; with the propellers differentiated in pitch, when passing to "reversion" there is no period of minimum torque on all the propellers, with the accompanying risk of racing. In fact, from touch-down, the outer propellers are in transparency or in reverse; when all the propellers commence pitch reversal, they are not all passed simultaneously through the pitch point corresponding to minimum torque.

Finally, the banking control by differential variation of the pitch of the outer propellers (in conjunction with the ailerons) has its effectiveness increased by reason of the low co-efficients of traction of the outer propellers.

This same principle can also be used as a piloting means in conjunction with the controls.

According to one form of embodiment of the invention, the aerodyne is equipped with a mechanical pitch control unit which can be controlled either by a propeller control device comprising an automatic hydraulic pitch-control unit or by a manual control; the control unit is associated with pitch-changing mechanisms which are connected respectively to each of the propellers and which can be of any desired known type.

The mechanical unit permits general pitch regulation, the symmetrical reduction of the pitch of the outer propellers, and differential pitch control in association with the banking control of the machine, when necessary.

It also makes it possible to bring all the propellers into the position known as the "reversion" or "reverse" position, in order to create an aerodynamic braking effect when landing, as mentioned hereinbefore.

The description which now follows with reference to the accompanying drawings, given by way of non-limitative example, will make it easy to understand how the invention can be carried into effect, the features brought out from the drawings and from the text being understood to form part of the said invention.

Figure 1:
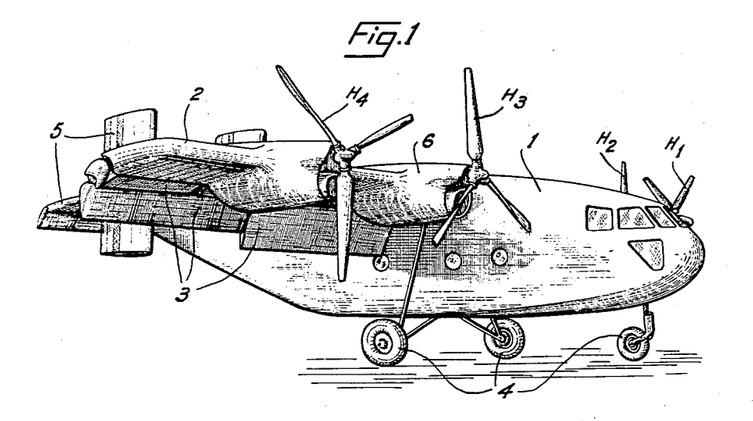
FIG. 1 is a diagrammatic perspective view of an aeroplane constructed in accordance with the present invention.

In the form of embodiment shown in the drawings, the aeroplane 1 comprises wide wings 2 provided with powerful high-lift flaps 3 and carrying in front of the said wings four large-diameter propellers of variable pitch $H_1$, $H_2$, $H_3$, $H_4$ (FIG. 1). The propellers $H_1$, $H_2$, and $H_3$, $H_4$ rotate in opposite directions, symmetrically with respect to the central longitudinal plane of the aeroplane.

The aeroplane rests on a tricycle undercarriage 4. It is provided also with large control surfaces 5.

The engines 6 driving the propellers are, for example, turbo-jet engines driving the propellers by means of appropriate reduction gear, for example at a maximum speed of 1,100 revolutions per minute.

Figure 2:
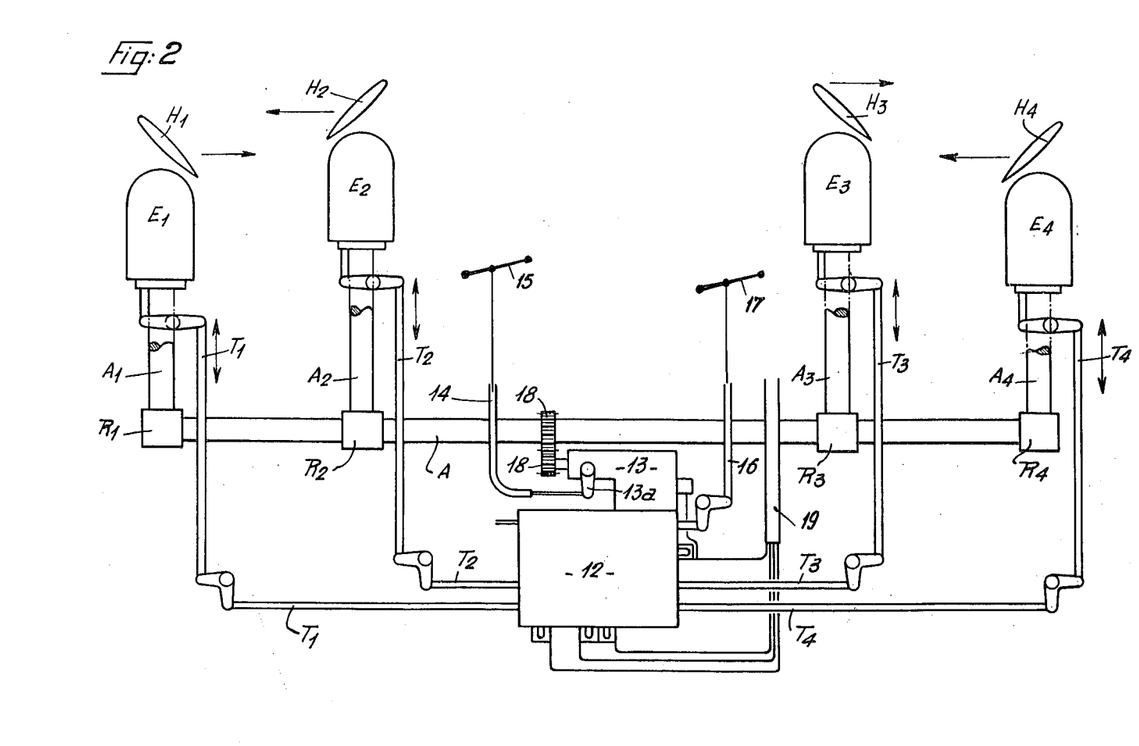
FIG. 2 is a diagrammatic plan view showing the general arrangement of the propellers of the aeroplane.

FIGURE 2 shows diagrammatically the propellers $H_1$, $H_2$, $H_3$ and $H_4$, each provided with a hydraulic pitch-changing mechanism $E_1$, $E_2$, $E_3$ or $E_4$ of known type, connected by linkage $T_1$, $T_2$, $T_3$ or $T_4$ to a mechanical control unit 12.

This unit is normally subjected to the control of an automatic pitch regulation device 13 of known type, for example a hydraulic device, whose control lever 13a is operated by means of a transmission 14 actuated by a lever 15 operated by the pilot.

The unit 12 can be controlled, when necessary, by a transmission 16 connected to a manual control lever 17 which is also at the disposal of the pilot.

The various electrical ducts necessary for its operation are designated as 19.

The driving shafts $A_1$, $A_2$, $A_3$ and $A_4$ of the various propellers are coupled by means of bevel gears $R_1$, $R_2$, $R_3$, $R_4$ to a general transmission shaft A which makes it possible, during normal operation, for the propellers to be rotated at the same speed. However, between the shaft A and each of the reduction gears associated with the propeller engines there is provided a freewheel (not shown) whereby the engine can be isolated in the event of an engine stopping.

The central shaft A is connected to the automatic pitch regulating device 13 by means of a gear train 18.

The mechanical unit 12, shown in FIGURES 3 to 13a, comprises an operating lever 39 pivotably connected at one of its ends to a pitch control rod 36 which connects it to the regulating device 13 and, at an intermediate point, to the end of the emergency manual control rod 16.

Figure 3:
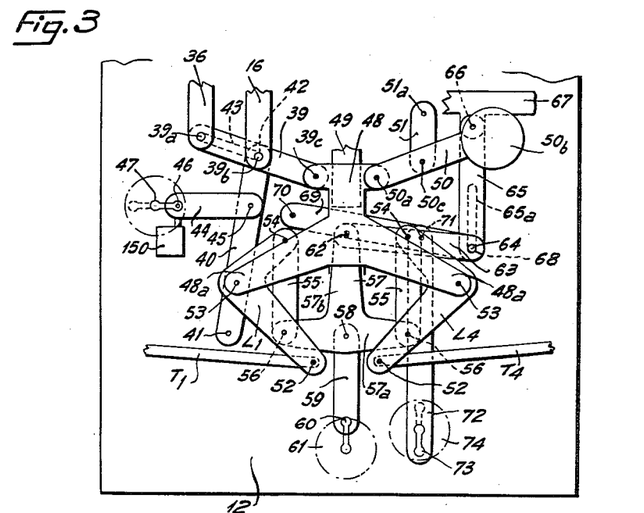
FIGURES 3 and 3a are diagrammatic views showing the essential elements of the mechanical control unit; the elements relating to the outer propellers and to the central propellers have had to be shown in separate views in order to enable the reader to distinguish them from one another whereas the elements common to the control of the two groups of propellers are shown in both figures. In these figures and also in the following figures, ordinary numbers relate to the control of the pitch of the outer propellers, whereas numbers followed by the letter *a* refer to the inner or central propellers.
Figure 3A:
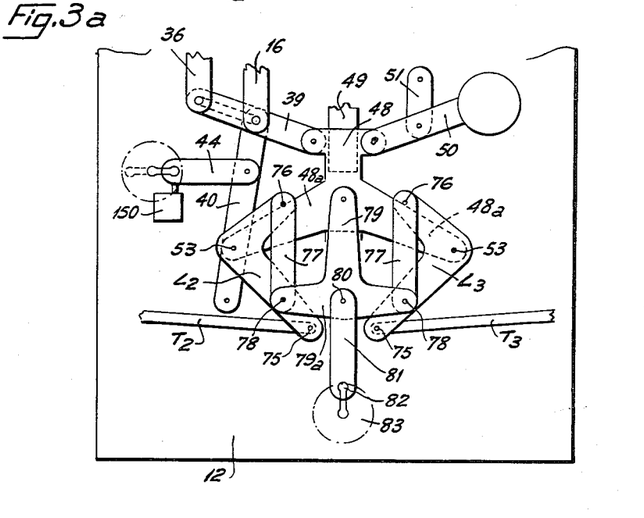

The effective axis of pivoting of this lever is determined by means of a lever 40 one end of which is connected for pivoting movement about a fixed pin 41 whilst its other end comprises a stud 42 engaged in a slot 43 of the lever 39, this slot extending between the pin 39a on which the rod 36 is articulated and the pin 39b on which the rod 16 is articulated.

A connecting rod 44, pivotably connected at one of its ends to an intermediate pin 45 of the lever 40 and, at its other end, to the pin 46 of an electric jack 47 makes it possible to bring the stud 42 either opposite the pin 39b in which case the manual safety control is rendered inoperative or opposite the pin 39a, in which it is the automatic control which does not operate.

The jack 47 is associated with a reversing contactor 150 which is intended to neutralize the automatic pitch-regulating device in the position corresponding to manual control.

The free end of the lever 39 is pivotably connected by a pin 39c to a central rocker 48 which can slide vertically on a guide 49 and to which is pivotably connected at 50a, a lever 50 provided with a counter-weight 50b. The lever 50 can pivot about a pin 50c carried by a rod 51 articulated to a fixed pin 51a.

All the elements which have just been described are common to the control of the four propellers and are therefore illustrated in FIGURES 3 and 3a.

FIGURE 3 concerns more particularly the pitch control of the outer propellers.

In this figure, the rod systems $T_1$ and $T_4$ leading to the pitch-changing assemblies $E_1$ and $E_4$ of the propellers (see also FIGURE 2) are respectively connected by pins 52 to the ends of one of the arms of bell-crank levers $L_1$ and $L_4$.

The control operation is supposed to be in the sense towards high pitches when the rod systems $T_1$ and $T_4$ are displaced towards the box 12 and in the sense of low pitches when they move away from this box.

The said bell-crank levers are articulated at their central portion by means of pins 53 to the arms 48a of the sliding rocker 48.

The other arms of the levers $L_1$ and $L_4$ are also connected, by pins 54, to rods 55 which are themselves articulated at 56 to the lower bar 57a of a part 57 in the form of an inverted T.

The said part 57 is itself pivotably connected in the middle of its lower bar, by means of a pin 58, to a rod 59 which is pivotably connected at 60 to an electric jack 61.

The end of the rod 57b of the part 57 is pivotably connected by a pin 62 to a rod 63 which is itself connected by a pin 64 to a rod 65 whose free end is connected at 66 to the banking control 67 of the aeroplane.

The rod 65 comprises a slideway 65a in which can be displaced the stud 68 provided at the end of a lever 69 pivoting on a fixed pin 70.

At an intermediate point, the said lever 70 is articulated, by a pin 71, to a rod 72 which is itself articulated at 73 to an electric jack 74.

In FIGURE 3a, which shows more particularly the elements of the pitch control system for the central propellers, the rod systems $T_2$ and $T_3$ associated with these propellers are pivotably connected by pins 75 respectively to the bell-crank levers $L_2$ and $L_3$ which are similar to the levers $L_1$ and $L_4$. The control direction of the rod systems $T_2$ and $T_3$ is the same as that of the rod systems $T_1$ and $T_4$ of FIGURE 3.

The levers $L_2$ and $L_3$ are pivotably connected by pins 53 to the arms 48a of the rocker 48. Their free arms are pivotably connected by pins 76 to rods 77 which are themselves pivotably connected at 78 to the ends of the lower bar 79a of a transverse part 79.

In the middle of its lower bar, this part is pivotably connected at 80 to a rod 81 which is itself pivotably connected at 82 to an electric jack 83.

For the sake of greater clarity, the operation of the relatively complicated mechanism which has just been described is illustrated in a whole series of partial views.

In each of these views, only the elements directly affected have been shown, and, of these elements, those which remain fixed are also indicated by hatching.

Figure 4:
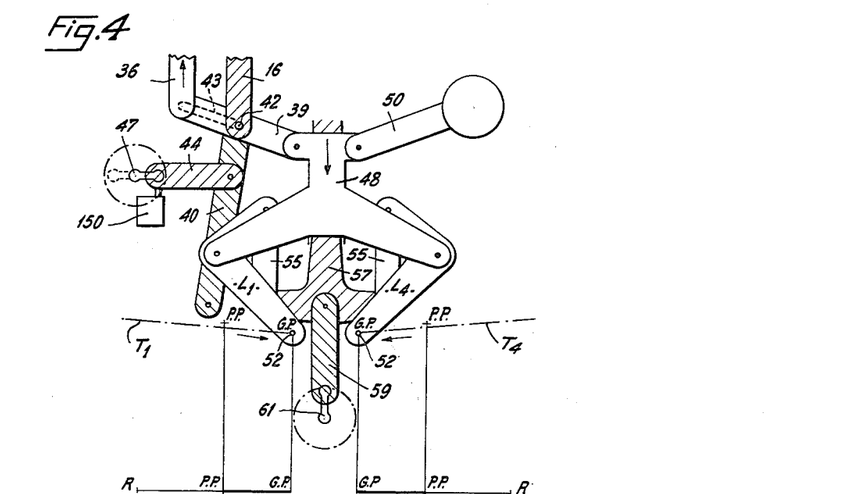
FIGURES 4 and 4a are diagrammatic partial views showing the positions of the elements of the mechanical control unit in the case of setting the propellers with a high pitch, with normal hydraulic control.
Figure 4A:
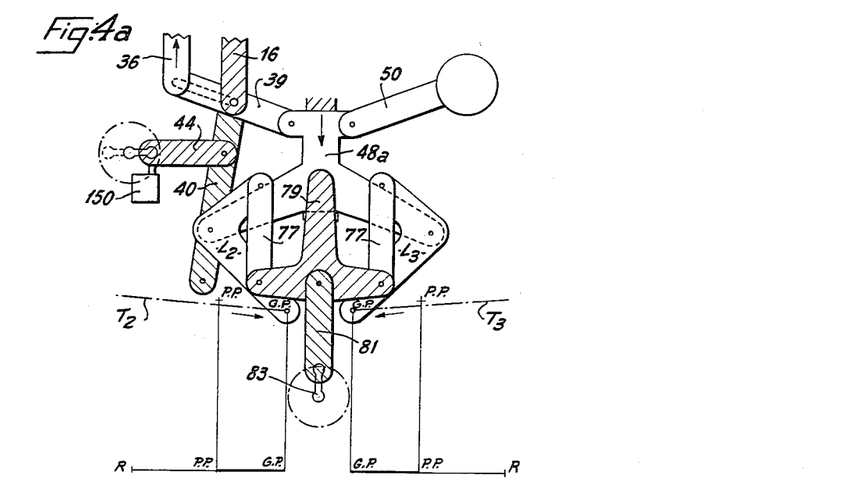

FIGURES 4 and 4a show the elements of the mechanical unit in the case of normal automatic regulation, these elements occupying the position corresponding to maximum high-pitch setting.

In FIGURE 4, the lever 40 is held by the jack 47 in a position such that its stud 42, situated at the left-hand end of the slideway 43 of the lever 39, serves as a pivot for the latter lever, on the axis of pivoting of the safety hand control 16 which is locked. The lever 44 acts on the contactor 150 which keeps the regulator 13 in service.

The rod 36 being lifted to the maximum extent, the rocker 48 occupies its maximum lower position and, by the action of the rods 55 which bear on the part 57 held fixed by the jack 61, it brings the lower arms of the levers $L_1$ and $L_4$ to exert the maximum pulling action on the rod systems $T_1$ and $T_4$.

At the foot of this figure there is shown a diagram bearing the indications G.P. (high pitch), P.P. (low pitch) and R (reverse). The normal regulation ranges are indicated in thick lines. FIGURE 4a shows the elements corresponding to the central propellers in a position similar to that shown in FIGURE 4, the levers $L_2$ and $L_3$ pulling to the maximum extent on the rod systems $T_2$ and $T_3$.

Figure 5:
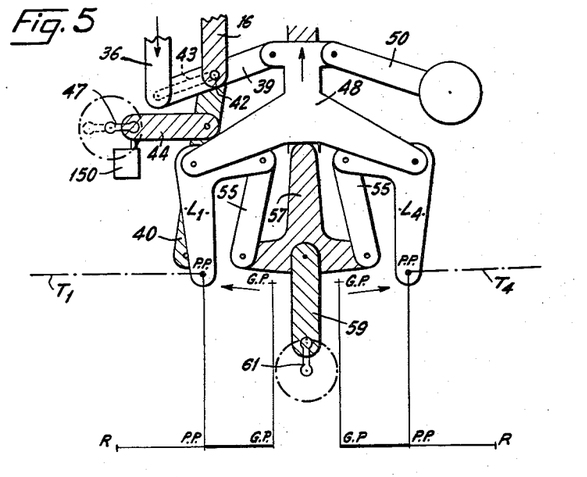
FIGURES 5 and 5a are views similar to the preceding but relating to regulation to a small pitch.
Figure 5A:
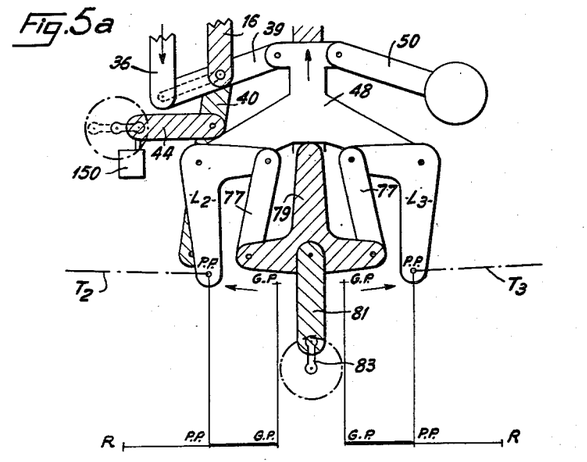

FIGURES 5 and 5a are similar to the preceding figures except for the difference that this time the rod 36 is in its lower end position and the central rocker 48 is lifted to the maximum and, therefore, the free ends of the levers $L_1$, $L_2$, $L_3$, $L_4$, repel the rod systems $T_1$, $T_2$, $T_3$, $T_4$ to the maximum. The regulation position is at the minimum low pitch.

FIGURES 6, 6a and 7, 7a are similar to the four preceding figures but they are concerned with operating by manual control.

Figure 6:
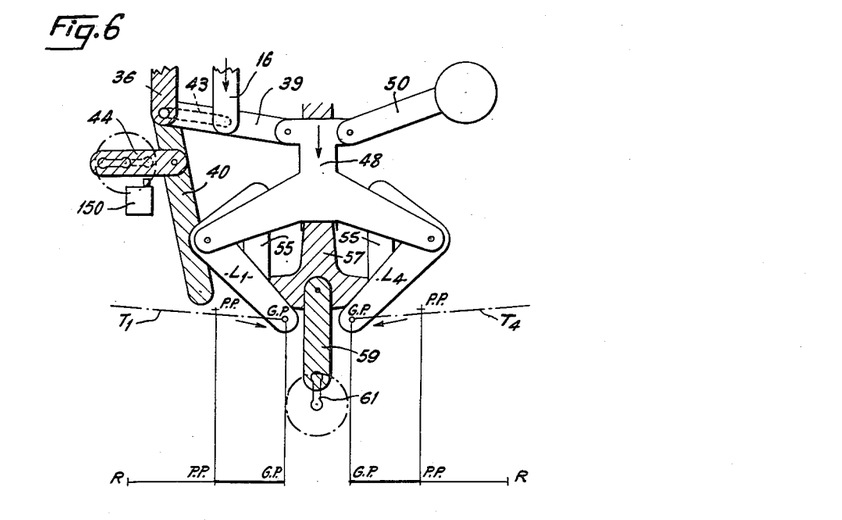
FIGURES 6–6a and 7–7a are views corresponding respectively to FIGURES 4–4a and 5–5a, illustrating the use of the emergency manual control.
Figure 6A:
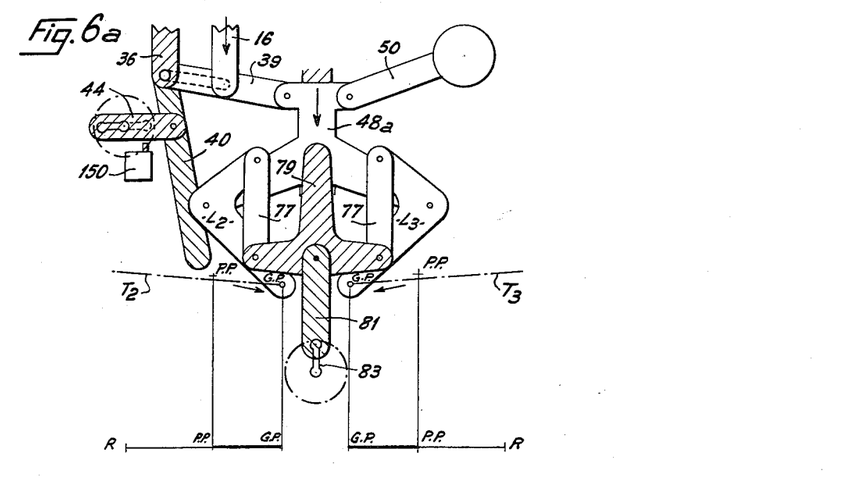
Figure 7:
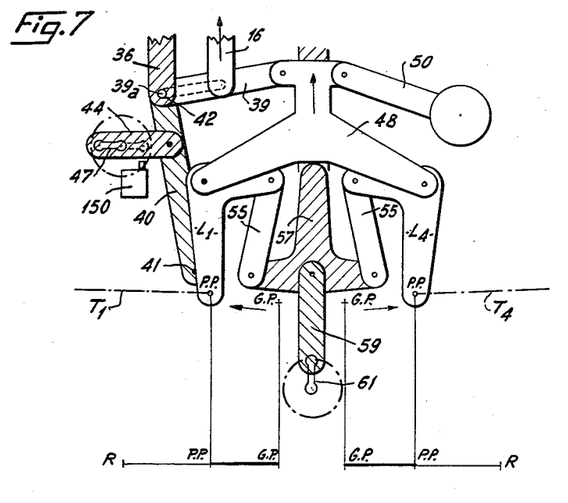
Figure 7A:
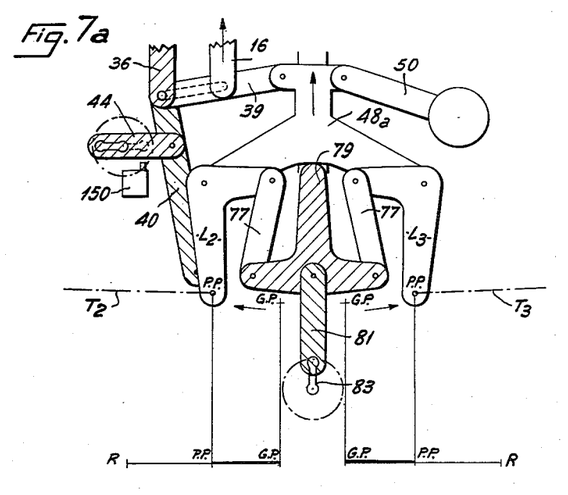

In order to bring the manual control arrangement into the operative state, the jack 47 must be operated, and this jack by means of a rod 44 brings the lever 40 into a position such that its stud 42 is situated opposite the pivot pin 39a of the rod 36c; this stud then serves as a pivot for the lever 39 which from then onwards obeys the rod system 16. The rod 44 also ceases to act on the contactor 150 which then brings about the neutralisation of the automatic regulating device 13. Otherwise, the positions of the various elements of the unit are respectively identical with those of the preceding figures. FIGURES 6 and 6a correspond to regulation to the maximum high pitch and FIGURES 7 and 7a to regulation to the maximum low pitch.

Figure 8:
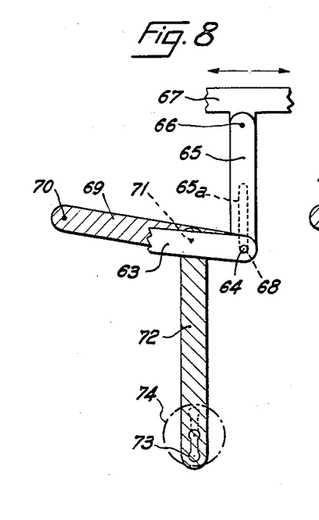
FIGURE 8 is a partial view showing the device enabling the mechanical elements for controlling the pitch of the outer propellers to be connected to the banking control of the machine with a view to a differential control of the pitch of the outer propellers, this connecting device being in the blocked position.

In FIGURE 8, which corresponds to normal flying conditions, the control arrangement for the differential variation of the pitch of the outer propellers is rendered inoperative since the jack 74 acting on the lever 69 by means of the rod 72 holds the stud 68 of this lever 69 in prolongation of the pivot pin 64 of the levers 63 and 65.

Under these circumstances, action on the banking control 67 makes itself felt solely by a free oscillation of the lever 65 about the axis 64, 68.

Figure 9:
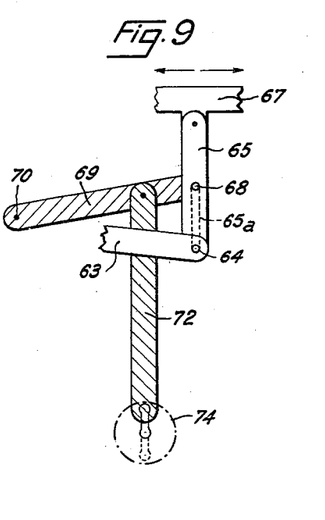
FIGURE 9 is a view similar to the preceding, showing the device in question in the operative position.

In FIGURE 9, the control arrangement for differential variation of pitch is, on the contrary, in the operative position. This position is used for flying at low speeds.

The jack 74 brings the stud 68 of the lever 69 to the bottom of the slideway 65a of the lever 65.

Under these circumstances, if one acts on the banking control 67, the lever 65 rocks about the stud 68 and transmits the movement to the lever 63.

Figure 10:
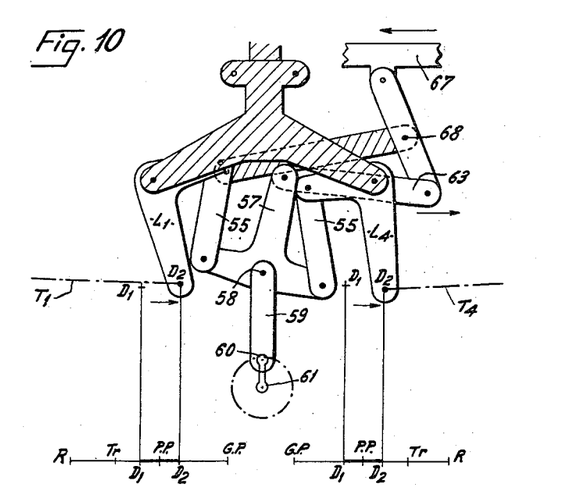
FIGURES 10 and 11 show the positions occupied by the elements relating to the outer propellers, respectively during control operations corresponding to banking to the left and to the right.
Figure 11:
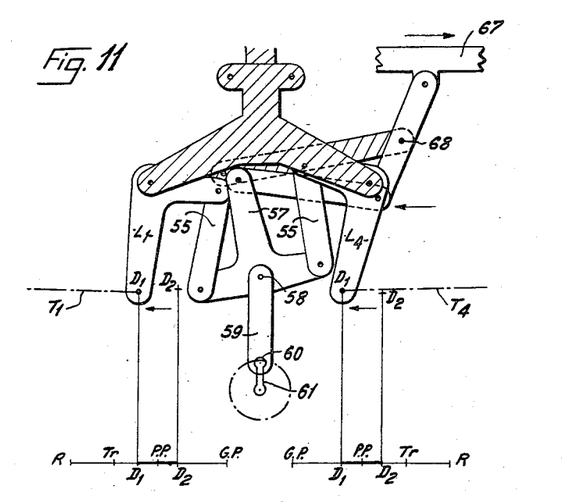

FIGURES 10 and 11 show the consequences of this transmission.

In FIGURE 10, the control 67 is displaced towards the left. Under the action of the lever 63, the central T-shaped part 57 pivots towards the right, shifting the levers $L_1$ and $L_4$ towards the right by the action of the rods 55.

FIGURE 11 shows the same elements as in the preceding figure, the banking control this time being shifted towards the right.

In the example illustrated in FIGURES 10 and 11, the general regulating system is assumed to be adjusted to low pitch.

The graphs added at the bottom of the figures show the ranges $D_1$, $D_2$ corresponding to the range of differential control. The ranges can extend over the entire "transparency" range and over almost the entire normal regulation range.

No figure has been given to illustrate the case of the differential control as far as the central propellers are concerned, no control of this kind being provided for them in the example described here. The elements of the mechanical unit corresponding to the said propellers would occupy the positions of FIGURES 5a or 7a (low pitch) according to whether normal regulation or emergency manual control was being used. This control is used according to the invention for an approach to landing, in order to increase the drag by reducing the pitch of the outer propellers.

Figure 12:
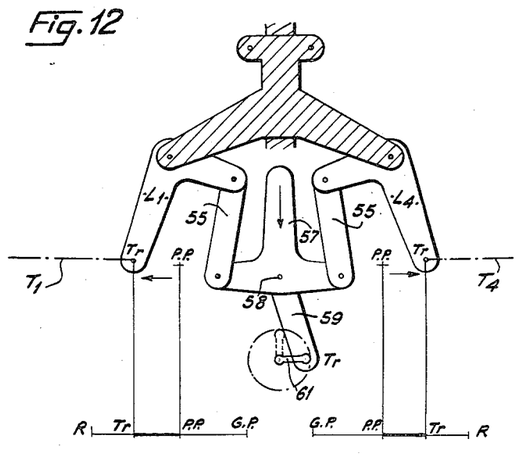
FIGURES 12 and 12a show respectively the positions of the elements of the mechanical unit in the control state corresponding to "transparency."

FIGURE 12 corresponds to the control arrangement for bringing the outer propellers to the "transparency" condition.

In the example illustrated, the elements of the mechanical unit of the propellers are assumed to be in the position corresponding to low pitch. However, transparency control can be effected over the entire normal regulation range.

To bring the outer propellers to the transparency state, the jack 61 is operated, and this jack carries out a quarter of a revolution and lowers the central part 57 by means of the rod 59. The action of the rods 55 thus causes the free arms of the levers $L_1$ and $L_4$ to be moved apart and the pitches of the propellers are reduced to the position Tr on the graph at the bottom of the figure.

Figure 12A:
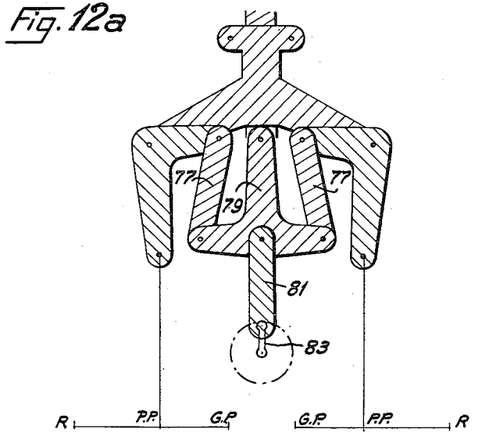

FIGURE 12a corresponds to the central propellers which are not shifted since no action takes place at the jack 83.

Figure 13:
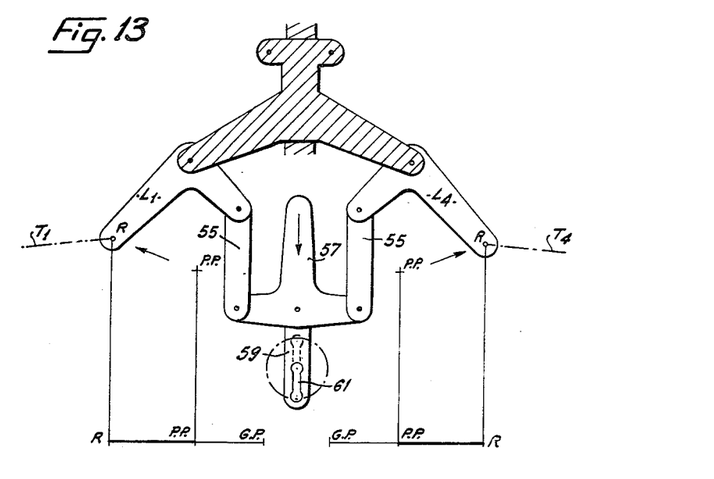
FIGURES 13 and 13a are views similar to the preceding views, relating to control of the propellers in "reverse."
Figure 13A:
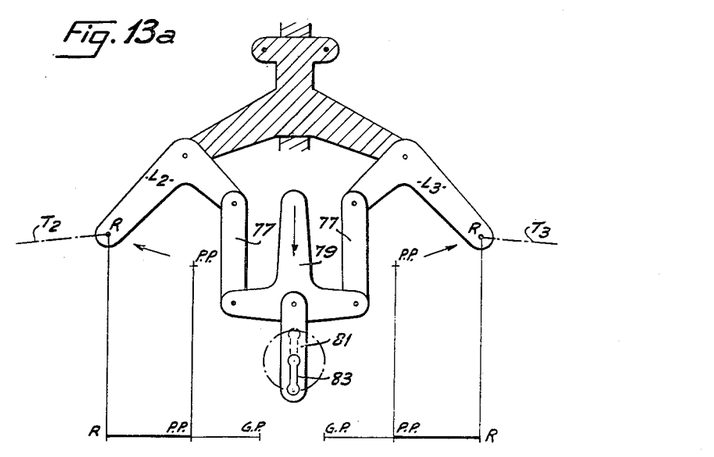

FIGURES 13 and 13a correspond to the position known as "reverse" which affects all four propellers. In practice, this position is used only when all the propellers are at low pitch, since it is used for providing an aerodynamic braking action upon landing when the aircraft has touched the ground.

In FIGURE 13, the jack 61 has rotated in all through a half-revolution and brought the central part 57 into the lowest position. The free ends of the levers $L_1$ and $L_4$ are spaced at the maximum and the pitches of the outer propellers brought to a negative value corresponding to the point R on the graph in the figure.

In FIGURE 13a, which corresponds to the central propellers, the jack 83 which has also carried out a half-revolution has lowered the central part 79 which, by means of rods 77, has spaced apart the levers $L_2$ and $L_3$ to the maximum extent.

It will be apparent that modification can be made to the forms of embodiment which have been described, more particularly by substitution of equivalent technical means, without, however, departing from the scope of the present invention.

What I claim is:

1. An aerodyne comprising a fuselage,
a wing mounted on each side of the fuselage,
at least two variable pitch propellers mounted in front of each wing symmetrically disposed with respect to the longitudinal axis of the aerodyne,
engine means carried by said aerodyne,
driving means interconnecting all of said propellers together and to said engine means for equal speed operation,
means coupled to said propellers for simultaneously adjusting the pitch of all of the propellers in the same direction,
and means operatively associated with said last mentioned means for simultaneously and symmetrically changing the pitch of the outboard propellers relative to the inboard propellers whereby the pitch of the outboard propellers can be reduced independently of the inboard propellers to introduce drag during low speed operation.

2. An aerodyne comprising a fuselage,
a wing mounted on each side of the fuselage,
at least two variable pitch propellers mounted in front of each wing symmetrically disposed with respect to the longitudinal axis of the aerodyne,
engine means carried by said aerodyne,
driving means interconnecting all of said propellers together and to said engine means for equal speed operation,
automatic regulator means coupled with all of said propellers for simultaneously adjusting the pitch thereof, said regulator means being coupled to said driving means and being of the type which for normal operation regulates the pitch of the propellers to maintain a preselected load on the engine means, and means operatively coupled with said regulator means for simultaneously and symmetrically overriding the control of said regulator on the outboard propellers independent of the inboard propellers whereby a reduction of the pitch of the outboard propellers by said last mentioned means to increase drag will be accompanied by an increase in pitch of the inboard propellers to maintain the slipstream lifting forces.

3. An aerodyne comprising a fuselage, a wing mounted on each side of the fuselage, at least two variable pitch propellers mounted in front of each wing symmetrically disposed with respect to the longitudinal axis of the aerodyne, engine means carried by said aerodyne, driving means interconnecting all of said propellers together and to said engine means for equal speed operation, a mechanical unit coupled to all of said propellers for controlling the pitch thereof, means coupled thereto for actuating said mechanical unit to maintain all of the propellers at the same pitch, and additional means coupled thereto for actuating said mechanical unit to simultaneously and symmetrically change the pitch of the outboard propellers relative to the inboard propellers whereby the pitch of the outboard propellers can be reduced independently of the inboard propellers to introduce drag during low speed operation.

4. An aerodyne according to claim 3, wherein the mechanical unit is provided with means for symmetrical differential control of propeller pitch, and said last mentioned means is provided with means for coupling it to the banking control of the aerodyne.

5. An aerodyne according to claim 3, wherein the means to maintain all of the propellers at the same pitch comprises an automatic regulating device and a manual control device, and means for selectably coupling one or the other of said devices in controlling relation to the mechanical unit.

6. An aerodyne according to claim 3, wherein the mechanical unit comprises a sliding control member having arms to which are pivotably connected four levers respectively connected by linkage to the various propellers for controlling the pitch thereof, and respective links joining the levers corresponding to the inboard propellers and joining the levers corresponding to the outboard propellers, said links being joined to said levers in such manner that the associated levers are articulated selectably either symmetrically or differentially by a corresponding movement of the related link, the means coupled to the mechanical unit to maintain all of the propellers at the same pitch being coupled to said sliding member for adjusting its position, and the additional means being coupled to said link corresponding to the outboard propellers for imparting movement thereto in a manner for operating the associated levers in a symmetrical fashion.

7. An aerodyne according to claim 6, wherein the additional means has at least two predetermined selectable settings one corresponding to the "transparency" pitch and the other corresponding to the reverse thrust pitch position.

8. An aerodyne according to claim 6, wherein means are coupled to the link corresponding to the inboard propellers for imparting movement thereto in a manner for operating the associated levers in a symmetrical fashion to a position corresponding to reverse thrust pitch of the propellers.

9. An aerodyne according to claim 6, wherein further means are coupled to the link corresponding to the outboard propellers for imparting movement thereto in a manner for operating the associated levers in a differential fashion.

10. An aerodyne according to claim 9, wherein said further means include means for coupling it to the banking control of the aerodyne.

11. An aerodyne comprising a fuselage, a wing mounted on each side of the fuselage, at least two variable pitch propellers mounted in front of each wing symmetrically disposed with respect to the longitudinal axis of the aerodyne, engine means carried by said aerodyne, driving means interconnecting all of said propellers together and to said engine means for equal speed operation, a mechanical unit coupled to all of said propellers for controlling the pitch thereof, said unit including a sliding control member having arms to which are pivotably connected four levers respectively connected by linkage to the various propellers for controlling the pitch thereof, and respective links joining the levers corresponding to the inboard propellers and joining the levers corresponding to the outboard propellers said links being joined to said levers in such manner that the associated levers are articulated selectably either symmetrically or differentially by a corresponding movement of the related link, a control lever coupled to said sliding control member for determining the position of the latter, said lever having first and second input members pivotally connected thereto at first and second spaced apart points respectively, and an adjustable fulcrum movable between said two pivot points, an automatic pitch regulating device operatively coupled to said first input member, a manual pitch control device operatively coupled to said second input member, means coupled to said fulcrum for selectably positioning it at said first or second pivot point thereby relegating control of said sliding control member selectably to said automatic or manual device, and additional means coupled to said link corresponding to the outboard propellers for imparting movement thereto in a manner for operating the associated levers in a symmetrical fashion thereby to change simultaneously and symmetrically the pitch of the outboard propellers relative to the inboard propellers.

12. An aerodyne according to claim 11, wherein the means coupled to said fulcrum includes means for neutralizing the automatic pitch regulating device when the fulcrum is positioned at said first pivot point.

References Cited in the file of this patent

UNITED STATES PATENTS

| | | |
|---|---|---|
| 2,855,054 | Morgan | Oct. 7, 1958 |
| 2,954,943 | De Lagabbe | Oct. 4, 1960 |